United States Patent
Yamamoto

(10) Patent No.: US 12,123,987 B2
(45) Date of Patent: Oct. 22, 2024

(54) ULTRASONIC SENSOR

(71) Applicant: Murata Manufacturing Co., Ltd., Nagaokakyo (JP)

(72) Inventor: Takahiro Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 216 days.

(21) Appl. No.: 17/992,974

(22) Filed: Nov. 23, 2022

(65) Prior Publication Data

US 2023/0111012 A1   Apr. 13, 2023

Related U.S. Application Data

(63) Continuation of application No. PCT/JP2021/022455, filed on Jun. 14, 2021.

(30) Foreign Application Priority Data

Jun. 17, 2020  (JP) .................................. 2020-104549

(51) Int. Cl.
*G01S 7/521* (2006.01)
*G01S 15/08* (2006.01)

(52) U.S. Cl.
CPC .............. *G01S 7/521* (2013.01); *G01S 15/08* (2013.01)

(58) Field of Classification Search
CPC ......... G01S 7/521; G01S 15/08; G01S 15/102
See application file for complete search history.

(56) References Cited

U.S. PATENT DOCUMENTS

| | | | | |
|---|---|---|---|---|
| 7,568,552 B2 * | 8/2009 | Litovsky | ................... | H04R 7/20 |
| | | | | 181/174 |
| 9,383,443 B2 * | 7/2016 | Bartylla | ................... | G10K 11/18 |
| D1,024,814 S * | 4/2024 | Song | ............................... | D10/74 |
| D1,024,818 S * | 4/2024 | Song | ............................... | D10/74 |

(Continued)

FOREIGN PATENT DOCUMENTS

| | | | | |
|---|---|---|---|---|
| CN | 115699809 A * | 2/2023 | ............. | G01S 15/08 |
| DE | 112021002364 T5 * | 2/2023 | ............. | G01S 15/08 |
| JP | 2002209294 A * | 7/2002 | ............. | G10K 9/122 |

(Continued)

OTHER PUBLICATIONS

International Search Report in PCT/JP2021/022455, mailed Aug. 10, 2021, 3 pages.

(Continued)

*Primary Examiner* — Daniel Pihulic
(74) *Attorney, Agent, or Firm* — Keating & Bennett, LLP

(57) ABSTRACT

An ultrasonic sensor includes a case, a piezoelectric element, and two weight portions. The case includes a circumferential wall portion extending in an axial direction. The two weight portions are provided on the circumferential wall portion outside the case so as not to overlap each other as seen in the axial direction. When a bottom portion of the ultrasonic sensor bends toward one side in the axial direction during vibration at a frequency of a first vibration mode, the two weight portions incline toward the other side in the axial direction. When the bottom portion bends toward one side in the axial direction during vibration at a frequency of a second vibration mode, the two weight portions incline toward one side in the axial direction.

20 Claims, 8 Drawing Sheets

(56) References Cited

U.S. PATENT DOCUMENTS

2008/0218030 A1    9/2008  Asada et al.
2023/0111012 A1 *  4/2023  Yamamoto ............ G01S 15/102
                                                            367/118

FOREIGN PATENT DOCUMENTS

| JP | 200572771 | A | | 3/2005 | | |
|---|---|---|---|---|---|---|
| JP | 7448007 | B2 | * | 3/2024 | ............ | G01S 15/08 |
| WO | 2007069609 | A1 | | 6/2007 | | |
| WO | WO-2021256414 | A1 | * | 12/2021 | ............ | G01S 15/08 |

OTHER PUBLICATIONS

Written Opinion in PCT/JP2021/022455, mailed Aug. 10, 2021, 3 pages.

* cited by examiner

ULTRASONIC SENSOR

CROSS REFERENCE TO RELATED APPLICATIONS

This application claims the benefit of priority to Japanese Patent Application No. 2020-104549 filed on Jun. 17, 2020 and is a Continuation Application of PCT Application No. PCT/JP2021/022455 filed on Jun. 14, 2021. The entire contents of each application are hereby incorporated herein by reference.

BACKGROUND OF THE INVENTION

1. Field of the Invention

The present invention relates to an ultrasonic sensor.

2. Description of the Related Art

An ultrasonic sensor described in U.S. Pat. No. 9,383,443 includes a housing, a transducer element, and at least one mass element. The housing includes a side wall portion and a base surface formed as a diaphragm. The transducer element is disposed on the base surface to generate and detect ultrasonic vibration. The at least one mass element is disposed on the base surface. The at least one mass element is disposed such that at least one of the force and the torque applied by the at least one mass element on the diaphragm increases as the vibrational frequency increases. The at least one mass element is disposed at the center of the base surface. The at least one mass element has an impedance that changes a third-order vibration mode of the diaphragm such that the third-order vibration mode of the diaphragm becomes close to the first-order vibration mode of the diaphragm.

The ultrasonic sensor described in U.S. Pat. No. 9,383,443 can transmit and receive two ultrasonic signals of different frequencies so as to correspond to two vibration modes by using the at least one mass element.

In the ultrasonic sensor described in U.S. Pat. No. 9,383,443, however, the at least one mass element is disposed on the base surface of the housing, so the transducer element cannot be easily attached to the base surface of the housing.

SUMMARY OF THE INVENTION

Preferred embodiments of the present invention provide ultrasonic sensors that each transmit and receive two ultrasonic signals of different frequencies and includes a bottom portion to which a piezoelectric element can be easily attached.

An ultrasonic sensor according to a preferred embodiment of the present invention includes a case, a bottom portion, and two weight portions. The case includes a bottomed cylindrical shape and includes a bottom portion and a circumferential wall portion extending from the bottom portion in an axial direction of a central axis of the bottom portion, the central axis being perpendicular or substantially perpendicular to the bottom portion. The piezoelectric element is disposed on the bottom portion inside the case. The two weight portions are provided on the circumferential wall portion outside the case so as not to overlap each other as seen in the axial direction. When the bottom portion bends toward one side in the axial direction during vibration at a frequency of a first vibration mode, the two weight portions incline toward another side in the axial direction. When the bottom portion bends toward the one side in the axial direction during vibration at a frequency of a second vibration mode, the two weight portions incline toward the one side in the axial direction.

According to preferred embodiments of the present invention, it is possible to provide ultrasonic sensors which each transmit and receive two ultrasonic signals of different frequencies and to which a piezoelectric element can be easily attached.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
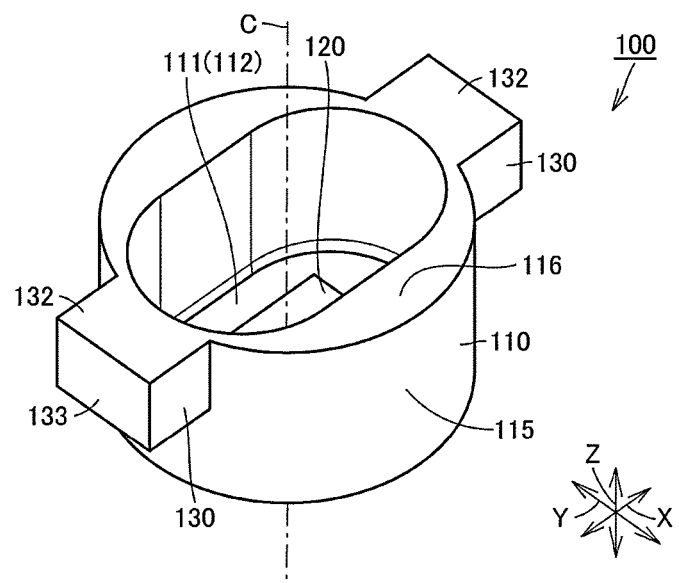
FIG. 1 is a perspective view of an ultrasonic sensor according to preferred embodiment 1 of the present invention as seen from the side opposite to a bottom portion.

Ultrasonic sensors according to preferred embodiments of the present invention will be described below with reference to the drawings. In the following description of the preferred embodiments, identical or corresponding portions in the drawings are given the same reference numerals to omit duplicate description.

Preferred Embodiment 1

Figure 2:
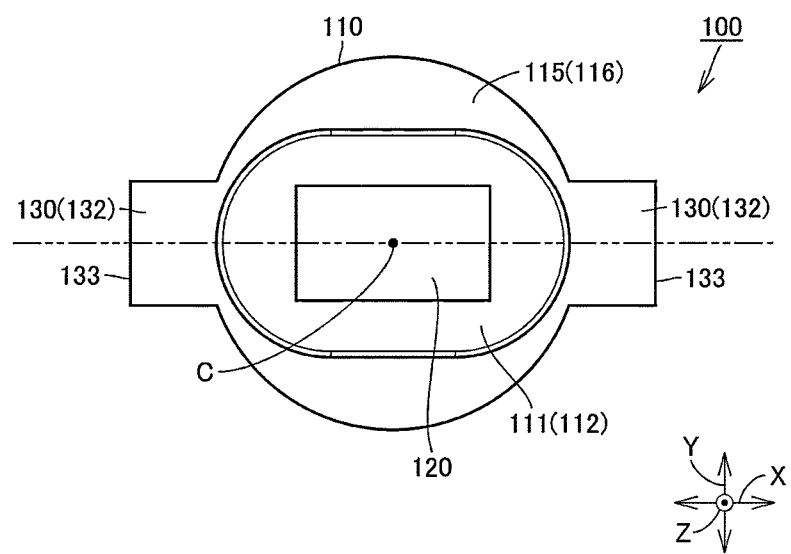
FIG. 2 is a plan view of the ultrasonic sensor according to preferred embodiment 1 of the present invention as seen from the side opposite to the bottom portion.
Figure 3:
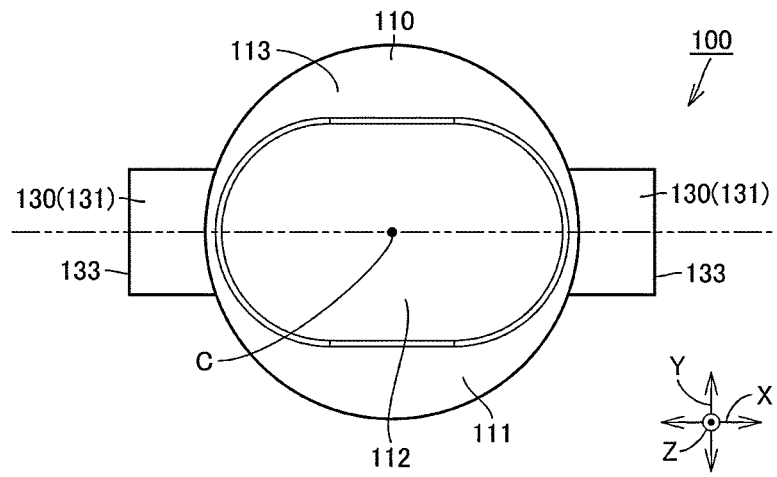
FIG. 3 is a bottom view of the ultrasonic sensor according to preferred embodiment 1 of the present invention as seen from the side of the bottom portion.
Figure 4:
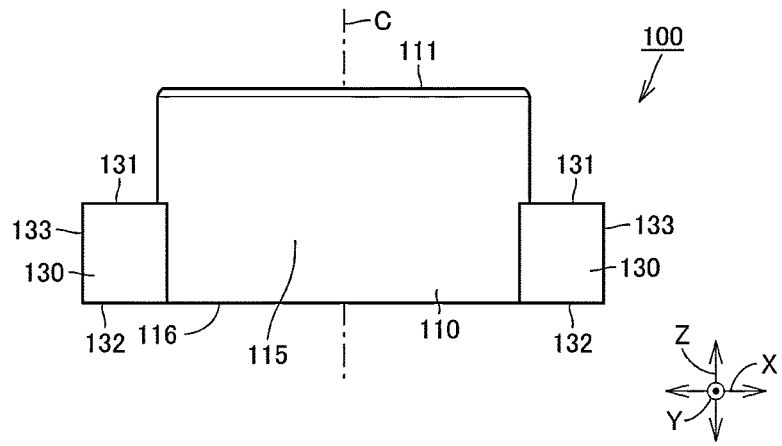
FIG. 4 is a side view illustrating the ultrasonic sensor according to preferred embodiment 1 of the present invention.

FIG. 1 is a perspective view of an ultrasonic sensor according to preferred embodiment 1 of the present invention as seen from the side opposite to a bottom portion. FIG. 2 is a plan view of the ultrasonic sensor according to preferred embodiment 1 of the present invention as seen from the side opposite to the bottom portion. FIG. 3 is a bottom view of the ultrasonic sensor according to preferred embodiment 1 of the present invention as seen from the side of the bottom portion. FIG. 4 is a side view illustrating the ultrasonic sensor according to preferred embodiment 1 of the present invention.

As illustrated in FIGS. 1 to 4, an ultrasonic sensor 100 according to preferred embodiment 1 of the present invention includes a case 110, a piezoelectric element 120, and two weight portions 130.

The case 110 is a bottomed cylinder and has a bottom portion 111 and a circumferential wall portion 115. The circumferential wall portion 115 extends from the bottom portion 111 in an axial direction Z of a central axis C of the bottom portion 111 perpendicular or substantially perpendicular to the bottom portion 111.

As illustrated in FIG. 3, the bottom portion 111 has a circular outline as seen in the axial direction Z. The bottom portion 111 has a central portion 112 and an outer circumferential portion 113 surrounding the central portion 112 when the ultrasonic sensor 100 is seen from the side of the bottom portion 111.

The center of the central portion 112 is located on the central axis C of the bottom portion 111 as seen in the axial direction Z. The shape of the central portion 112 is not particularly limited as seen in the axial direction Z, but the central portion 112 has an outline of a rounded rectangle in the present preferred embodiment. Specifically, the central portion 112 has an outline of a rounded rectangle as seen in the axial direction Z. More specifically, each of a pair of short sides of the rounded rectangle has a semicircular shape. The central portion 112 has a longitudinal direction X and a lateral direction Y as seen in the axial direction Z. The long sides of the central portion 112 extend in the longitudinal direction X of the central portion 112. The short sides of the central portion 112 extend in the lateral direction Y of the central portion 112 which is perpendicular or substantially perpendicular to the longitudinal direction X.

The inner circumferential edge of the outer circumferential portion 113 is disposed along the outer circumferential edge of the central portion 112 as seen in the axial direction Z. The outer circumferential edge of the outer circumferential portion 113 defines the outer circumferential edge of the bottom portion 111 as seen in the axial direction Z.

As illustrated in FIGS. 1 to 4, the surface of the central portion 112 facing the outside of the case 110 and the surface of the central portion 112 facing the inside of the case 110 are perpendicular or substantially perpendicular to the axial direction Z. The surface of the outer circumferential portion 113 facing the outside of the case 110 is perpendicular or substantially perpendicular to the axial direction Z. The surface of the bottom portion 111 facing the outside of the case 110 is recessed in the central portion 112.

As illustrated in FIGS. 1 to 4, the circumferential wall portion 115 extends in the axial direction Z from the outer circumferential portion 113 of the bottom portion 111. The circumferential wall portion 115 has an open end surface 116 disposed on the side opposite to the bottom portion 111. The open end surface 116 is perpendicular or substantially perpendicular to the axial direction Z. The open end surface 116 has the same outline shape as the outer circumferential portion 113 as seen in the axial direction Z in the present preferred embodiment, but the shape of the open end surface 116 is not particularly limited. The open end surface 116 may have an area that is smaller than that of the outer circumferential portion 113 as seen in the axial direction Z.

The case 110 is made of a conductive material, such as aluminum or aluminum alloy. It should be noted that the case 110 may be made of an insulating material.

As illustrated in FIGS. 1 and 2, the piezoelectric element 120 is disposed on the bottom portion 111 inside the case 110. Specifically, the piezoelectric element 120 is disposed in the central portion 112. The piezoelectric element 120 is bonded to the central portion 112 by an adhesive of, for example, an epoxy resin. As illustrated in FIG. 2, the center of the piezoelectric element 120 is preferably located on the central axis C as seen in the axial direction Z.

The structure of the piezoelectric element 120 is not particularly limited. The piezoelectric element 120 may include a piezoelectric body made of a piezoelectric ceramic, such as PZT (lead zirconate titanate), and a pair of electrodes disposed so as to clamp this piezoelectric body from both sides in the axial direction Z.

As illustrated in FIGS. 1 to 4, the two weight portions 130 are provided on the circumferential wall portion 115 outside the case 110 so as not to overlap each other as seen at least in the axial direction Z. Specifically, the two weight portions 130 are located on a single virtual straight line passing through the central axis C as seen in the axial direction Z. In addition, the two weight portions 130 are located at a single position in the axial direction Z.

The shapes of the two weight portions 130 are not particularly limited. In the present preferred embodiment, the two weight portions 130 have shapes that are rotationally symmetric with each other about the central axis C. The two weight portions 130 are provided to extend radially from the outer circumferential portion 113 about the central axis C as the center, as seen in the axial direction Z. In addition, each of the two weight portions 130 includes a first end surface 131, a second end surface 132, and a side end surface 133.

The first end surface 131 faces the bottom portion 111 in the axial direction Z. The first end surface 131 is perpendicular or substantially perpendicular to the axial direction Z. The first end surface 131 is spaced apart from the bottom portion 111. The second end surface 132 faces away from the first end surface 131. That is, the second end surface 132 faces away from the bottom portion 111 in the axial direction Z. The second end surface 132 is perpendicular or substantially perpendicular to the axial direction Z. The position of the second end surface 132 in the axial direction Z is not particularly limited, but in the preferred embodiment the second end surface 132 is located in the same position as the open end surface 116 in the axial direction Z. That is, the second end surfaces 132 of the two weight portions 130 are continuous with the open end surface 116. The side end surface 133 is perpendicular or substantially perpendicular to the radial direction with respect to the central axis C as the center, as seen in the axial direction Z.

The material of the two weight portions 130 is not particularly limited. In the present preferred embodiment, the two weight portions 130 are made of the same material as the case 110 and are integrated with the case 110.

Figure 5:
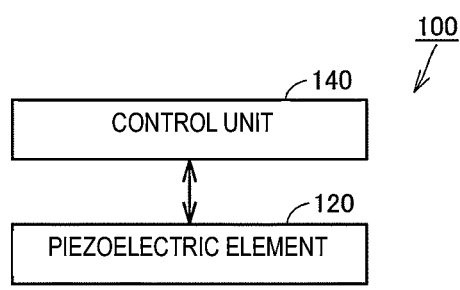
FIG. 5 is a block diagram illustrating the circuit structure of the ultrasonic sensor according to preferred embodiment 1 of the present invention.

FIG. 5 is a block diagram illustrating the circuit structure of the ultrasonic sensor according to preferred embodiment 1 of the present invention. As illustrated in FIG. 5, the ultrasonic sensor 100 according to preferred embodiment 1 of the present invention further includes a control unit 140. The control unit 140 is electrically connected to the piezoelectric element 120. The control unit 140 can apply pulse voltages of various frequencies to the piezoelectric element 120. In other words, the control unit 140 can transmit pulse signals of various frequencies to the piezoelectric element 120. The control unit 140 can receive, as a signal, a voltage generated by vibration of the bottom portion 111 in the piezoelectric element 120.

The control unit 140 is disposed, for example, outside the case 110. The control unit 140 is electrically connected to the piezoelectric element 120 via a conductive member including a flexible printed circuit (FPC) having, for example, a resin sheet and wiring, and two wiring portions connected to this FPC. For example, the conductive member described above is inserted into the opening formed in the open end surface 116 from the outside of the case 110 and is disposed inside the case 110. It should be noted that the control unit 140 may be electrically connected to the piezoelectric element 120 via a lead wire.

The ultrasonic sensor 100 according to preferred embodiment 1 of the present invention may further include a filling member and a sound absorbing material. The filling member is made of, for example, silicone foam, and the case 110 is filled with the filling member. The filling member is disposed to attenuate the unnecessary vibrations of frequencies that differ from the resonance frequency when the bottom portion 111 of the case 110 resonates at the resonance frequency. The sound absorbing material is provided on the side opposite to bottom portion 111 of the piezoelectric element 120. The sound absorbing material absorbs the ultrasonic sound transmitted to the inside of the case 110 when an ultrasonic sound is transmitted to the outside of the case 110 from the bottom portion 111.

The methods of transmitting and receiving an ultrasonic sound by using the ultrasonic sensor 100 according to preferred embodiment 1 of the present invention will be described. First, when an ultrasonic sound is transmitted by the ultrasonic sensor 100, the control unit 140 applies a pulse voltage to the piezoelectric element 120 as illustrated in FIG. 5. This causes the piezoelectric element 120 to vibrate. Then, as illustrated in FIGS. 1 to 4, the vibration of the piezoelectric element 120 causes mainly the central portion 112 of the bottom portion 111 connected to the piezoelectric element 120 to vibrate. This can transmit an ultrasonic sound from the bottom portion 111 to the outside of the case 110.

When an ultrasonic sound is received by the ultrasonic sensor 100, the ultrasonic sound, from the outside of the case 110, having hit mainly the central portion 112 of the bottom portion 111 causes mainly the central portion 112 of the bottom portion 111 to vibrate. The vibration of mainly the central portion 112 of the bottom portion 111 generates a voltage in the piezoelectric element 120. As illustrated in FIG. 5, the control unit 140 receives the voltage generated in the piezoelectric element 120 as a signal. The ultrasonic sensor 100 can receive an ultrasonic sound in this way.

The ultrasonic sensor 100 according to the present preferred embodiment can be used as a distance measuring device to measure the distance to an object disposed outside by, for example, transmitting an ultrasonic sound and receiving the ultrasonic sound reflected by the object.

In addition, the case 110 and the weight portions 130 of the ultrasonic sensor 100 according to the present preferred embodiment can vibrate in at least two vibration modes. In addition, the ultrasonic sensor 100 according to the present preferred embodiment has the two weight portions 130, so that the bottom portion 111 can vibrate at resonance frequencies that differ from each other in the two vibration modes. Experimental example 1 in which the deformation of the case 110 and the weight portions 130 of the ultrasonic sensor 100 has been examined in the two vibration modes will be described below.

In experimental example 1, a simulation analysis of the deformation of the case during vibration in the two vibration modes was performed on the ultrasonic sensor according to example 1. The simulation analysis was performed by resonance analysis (modal analysis) that uses the finite element method. The case and the weight portions of the ultrasonic sensor according to example 1 have the same structures as in the ultrasonic sensor 100 according to preferred embodiment 1. In addition, in experimental example 1, the diameter of the bottom portion 111 as seen in the axial direction Z is 15.5 mm, the dimension in the axial direction Z from the surface of the bottom portion 111 that faces the outside of the case 110 to the first end surfaces 131 of the weight portions 130 is 4.77 mm, the length of the weight portions 130 in the axial direction Z is 4.2 mm, the length of the weight portions 130 in the radial direction with respect to the central axis C as the center is 3.55 mm, and the length of the weight portions 130 in the direction perpendicular or substantially perpendicular to the radial direction with respect to the central axis C as the center, as seen in the axial direction Z, is 5.2 mm.

Figure 6:
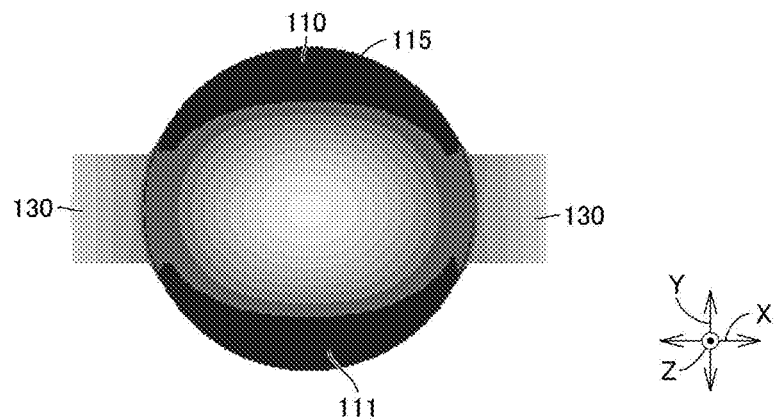
FIG. 6 is a bottom view illustrating, by a simulation, one state in which a case and weight portions of an ultrasonic sensor according to example 1 vibrate at the frequency of a first vibration mode.
Figure 7:
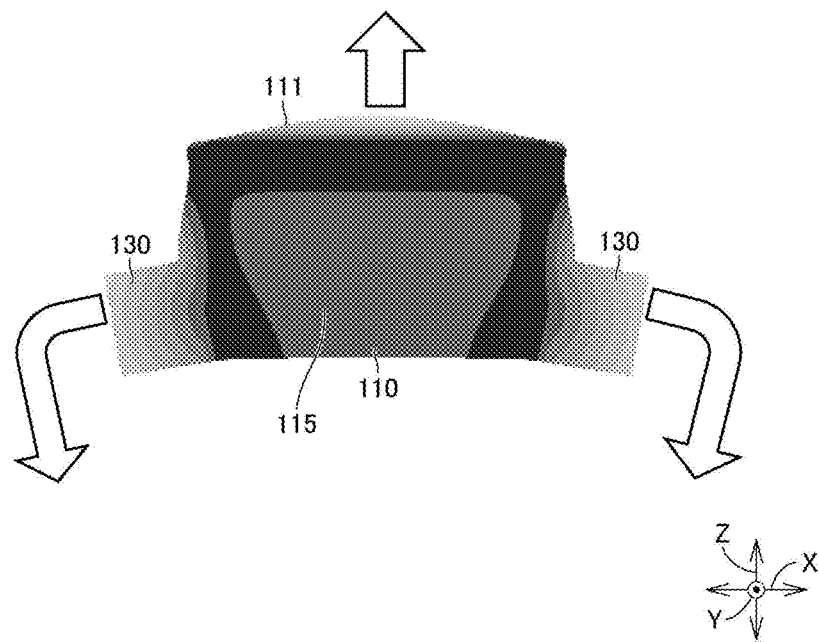
FIG. 7 is a side view illustrating, by a simulation, one state in which the case and the weight portions of the ultrasonic sensor according to example 1 vibrate at the frequency of the first vibration mode.
Figure 8:
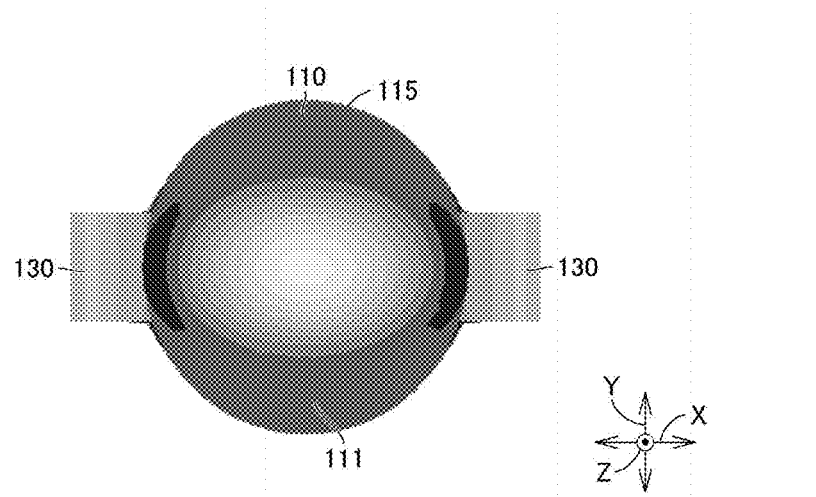
FIG. 8 is a bottom view illustrating, by a simulation, one state in which the case and the weight portions of the ultrasonic sensor according to example 1 vibrate at the frequency of a second vibration mode.
Figure 9:
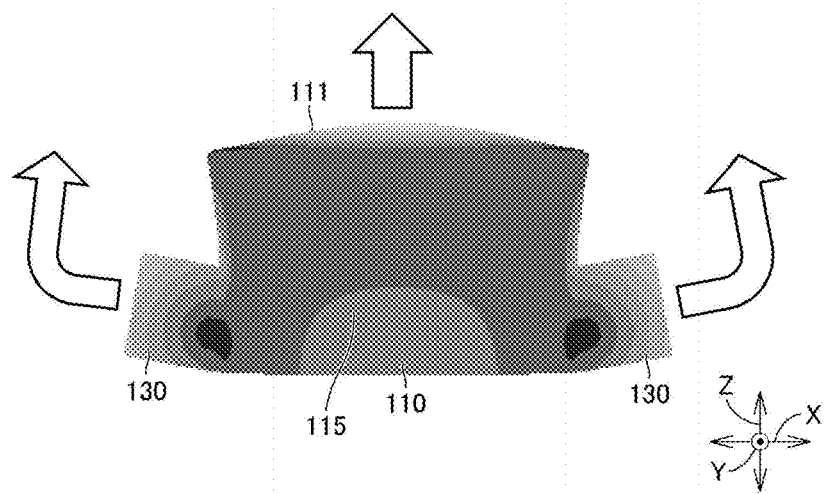
FIG. 9 is a side view illustrating, by a simulation, one state in which the case and the weight portions of the ultrasonic sensor according to example 1 vibrate at the frequency of the second vibration mode.

FIG. 6 is a bottom view illustrating, by a simulation, one state in which the case and the weight portions of the ultrasonic sensor according to example 1 vibrate at the frequency of the first vibration mode. FIG. 7 is a side view illustrating, by a simulation, one state in which the case and the weight portions of the ultrasonic sensor according to example 1 vibrate at the frequency of the first vibration mode. FIG. 8 is a bottom view illustrating, by a simulation, one state in which the case and the weight portions of the ultrasonic sensor according to example 1 vibrate at the frequency of a second vibration mode. FIG. 9 is a side view illustrating, by a simulation, one state in which the case and the weight portions of the ultrasonic sensor according to example 1 vibrate at the frequency of the second vibration mode. FIGS. 6 to 9 illustrate the case and weight portions of the ultrasonic sensor as contour figures in which the larger the amount of deformation of the individual portions from the initial state, the whiter the representation. In addition, in FIGS. 6 to 9, the ultrasonic sensor according to example 1 is given the same reference numerals as the ultrasonic sensor 100 according to preferred embodiment 1.

As illustrated in FIGS. 6 and 7, in the ultrasonic sensor according to example 1, when a pulse voltage was applied to the piezoelectric element 120 to cause the case 110 to vibrate in the first vibration mode (basic vibration mode), the case 110 vibrated such that, if the bottom portion 111 bent toward one side in the axial direction Z, the two weight portions 130 inclined toward the other side in the axial direction Z. The frequency of the pulse voltage at this time was 45.082 kHz. On the other hand, as illustrated in FIGS. 8 and 9, in the ultrasonic sensor according to example 1, when a pulse voltage identical to the pulse voltage applied in the first vibration mode with the exception of the frequency was applied to the piezoelectric element 120 to cause the case 110 to vibrate in the second vibration mode, the case 110 vibrated such that the two weight portions 130 inclined toward one side in the axial direction Z when the bottom portion 111 bent toward one side in the axial direction Z. The frequency of the pulse voltage at this time was 53.717 kHz.

That is, as illustrated in FIGS. 6 to 9, in the ultrasonic sensor according to experimental example 1, the bottom portion 111 deformed in the second vibration mode in substantially the same manner as in the first vibration mode and vibrated in the axial direction Z. Accordingly, it was discovered that, in the ultrasonic sensor according to example 1, the bottom portion 111 could vibrate with substantially the same vibration intensity at two different resonance frequencies and the ultrasonic sensor could transmit and receive two ultrasonic sounds of different frequencies.

That is, as illustrated in experimental example 1 described above, in the ultrasonic sensor 100 according to preferred embodiment 1 of the present invention, the two weight portions 130 are provided on the circumferential wall portion 115 outside the case 110 so as not to overlap each other as seen in the axial direction Z. In addition, during vibration at the frequency of the first vibration mode, when the bottom portion 111 bends toward one side in the axial direction Z, the two weight portions 130 incline toward the other side in the axial direction Z. During vibration at the frequency of the second vibration mode, when the bottom portion 111 bends toward one side in the axial direction Z, the two weight portions 130 incline toward one side in the axial direction.

Accordingly, the ultrasonic sensor 100 according to the present preferred embodiment can treat the ultrasonic sound having the frequency of the second vibration mode in the same manner as the ultrasonic sound transmitted and received at the frequency of the first vibration mode. That is, the ultrasonic sensor 100 can transmit and receive two ultrasonic signals of different frequencies. Furthermore, since the two weight portions 130 are provided on the circumferential wall portion 115 outside the case 110, the piezoelectric element 120 can be easily attached to the bottom portion 111 inside the case 110.

In addition, when the ultrasonic sensor 100 further includes a sound absorbing material disposed inside the case 110, since the sound absorbing material does not make direct contact with the weight portions 130, the sound absorbing material does not interfere with the deformation of the weight portions 130 when the weight portions 130 vibrate.

In the ultrasonic sensor 100 according to the present preferred embodiment, preferably, the directivity of the ultrasonic sound that can be transmitted and received when the case 110 vibrates in the first vibration mode differs notably from the directivity of the ultrasonic sound that can be transmitted and received when the case 110 vibrates in the second vibration mode. Since the directivity in the first vibration mode differs notably from the directivity in the second vibration mode, the distance to an object disposed outside the ultrasonic sensor 100 and the height of the object can be detected by transmitting ultrasonic sounds of two frequencies toward the object and receiving the ultrasonic sounds reflected by the object.

In addition, in the ultrasonic sensor 100 according to the present preferred embodiment, preferably, the frequency of the first vibration mode is close to the frequency of the second vibration mode. When the frequencies are close to each other, the bandwidth of the driving frequencies of the ultrasonic sensor 100 can be increased.

Furthermore, in the present preferred embodiment, the two weight portions 130 are located on a single virtual straight line passing through the central axis C as seen in the axial direction Z. This makes the shape of the bottom portion 111 deformed during vibration at the frequency of the second vibration mode closer to the shape of the bottom portion 111 deformed during vibration at the frequency of the first vibration mode. Ultimately, the vibration intensity during vibration in the second vibration mode can be increased.

Furthermore, in the present preferred embodiment, the two weight portions 130 have shapes that are rotationally symmetric with each other about the central axis C. This makes the shape of the bottom portion 111 deformed during vibration at the frequency of the second vibration mode further closer to the shape of the bottom portion 111 deformed during vibration at the frequency of the first vibration mode. Ultimately, the vibration intensity during vibration in the second vibration mode can be further increased.

Preferred Embodiment 2

An ultrasonic sensor according to preferred embodiment 2 of the present invention will be described below. The shape of the weight portions of the ultrasonic sensor according to preferred embodiment 2 of the present invention differs from that of the ultrasonic sensor 100 according to preferred embodiment 1 of the present invention. Accordingly, the components identical to or corresponding to those of the ultrasonic sensor according to preferred embodiment 1 of the present invention will not be described.

Figure 10:
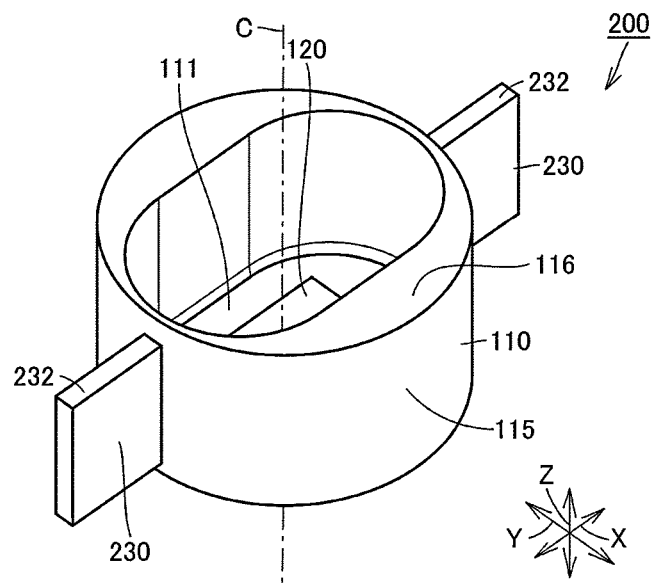
FIG. 10 is a perspective view of an ultrasonic sensor according to preferred embodiment 2 of the present invention as seen from the side opposite to a bottom portion.
Figure 11:
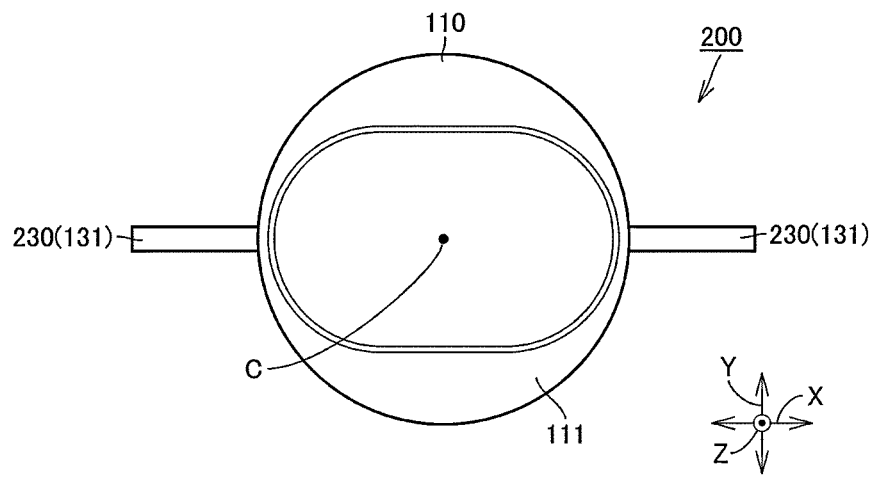
FIG. 11 is a bottom view of the ultrasonic sensor according to preferred embodiment 2 of the present invention as seen from the side of the bottom portion.
Figure 12:
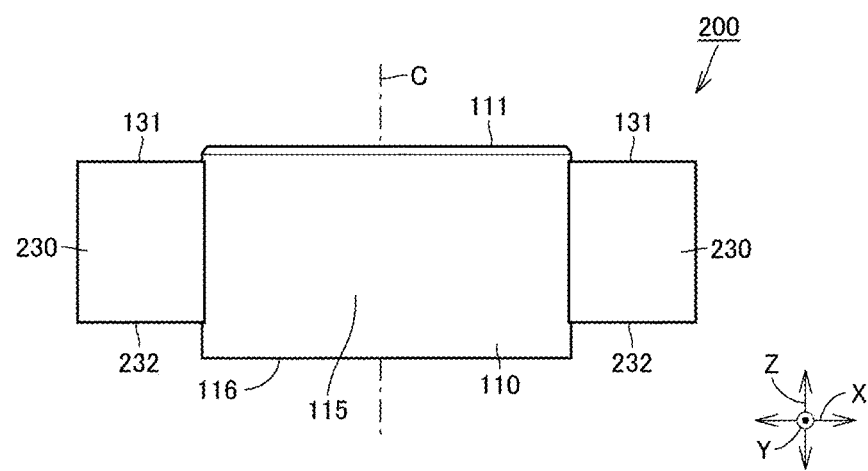
FIG. 12 is a side view illustrating the ultrasonic sensor according to preferred embodiment 2 of the present invention.

FIG. 10 is a perspective view of the ultrasonic sensor according to preferred embodiment 2 of the present invention as seen from the side opposite to the bottom portion. FIG. 11 is a bottom view of the ultrasonic sensor according to preferred embodiment 2 of the present invention as seen from the side of the bottom portion. FIG. 12 is a side view illustrating the ultrasonic sensor according to preferred embodiment 2 of the present invention. As illustrated in FIGS. 10 to 12, in the ultrasonic sensor 200 according to preferred embodiment 2 of the present invention, second end surfaces 232 of two weight portions 230 are spaced apart from the open end surface 116 in the axial direction Z. That is, the two weight portions 230 are located such that the second end surfaces 232 are spaced apart from the open end surface 116.

Since the ultrasonic sensor 200 according to the present preferred embodiment also includes the two weight portions 230, the bottom portion 111 can vibrate at different resonance frequencies in the two vibration modes. Experimental example 2 in which the deformation of the case 110 of the ultrasonic sensor 200 has been examined in the two vibration modes will be described below.

In experimental example 2, the same simulation analysis as in the experimental example 1 was performed on the ultrasonic sensor according to example 2. The case and the weight portions of the ultrasonic sensor according to example 2 have the same structures as those of the ultrasonic sensor according to preferred embodiment 2. In addition, in experimental example 2, the diameter of the bottom portion 111 as seen in the axial direction Z is 15.5 mm, the dimension in the axial direction Z from the surface of the bottom portion 111 that faces the outside of the case 110 to the first end surfaces 131 of the weight portions 230 is 1.5 mm, the dimension in the axial direction Z from the open end surface 116 to the second end surfaces 232 of the weight portions 230 is 0.7 mm, the length of the weight portions 230 in the axial direction Z is 6.79 mm, the length of the weight portions 230 in the radial direction with respect to the central axis C as the center is 5.25 mm, and the length of the weight portions 230 in the direction perpendicular or substantially perpendicular to the radial direction with respect to the central axis C as the center, as seen in the axial direction Z, is 1 mm.

Figure 13:
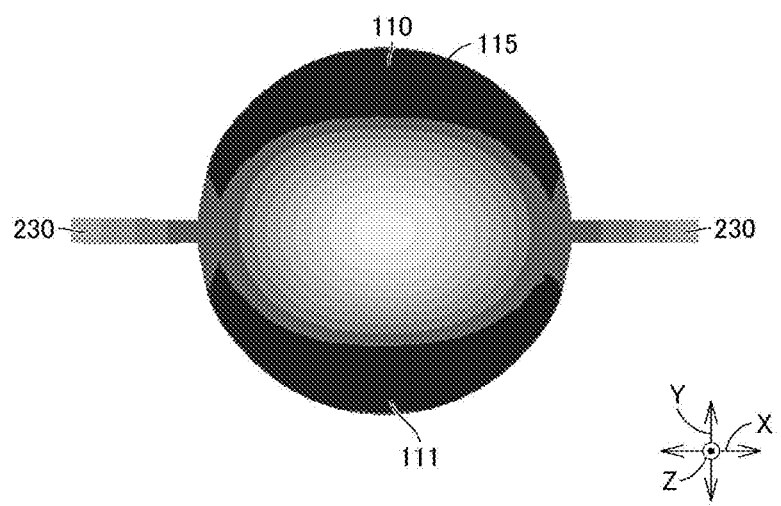
FIG. 13 is a bottom view illustrating, by a simulation, one state in which a case and weight portions of the ultrasonic sensor according to example 2 vibrate at the frequency of the first vibration mode.
Figure 14:
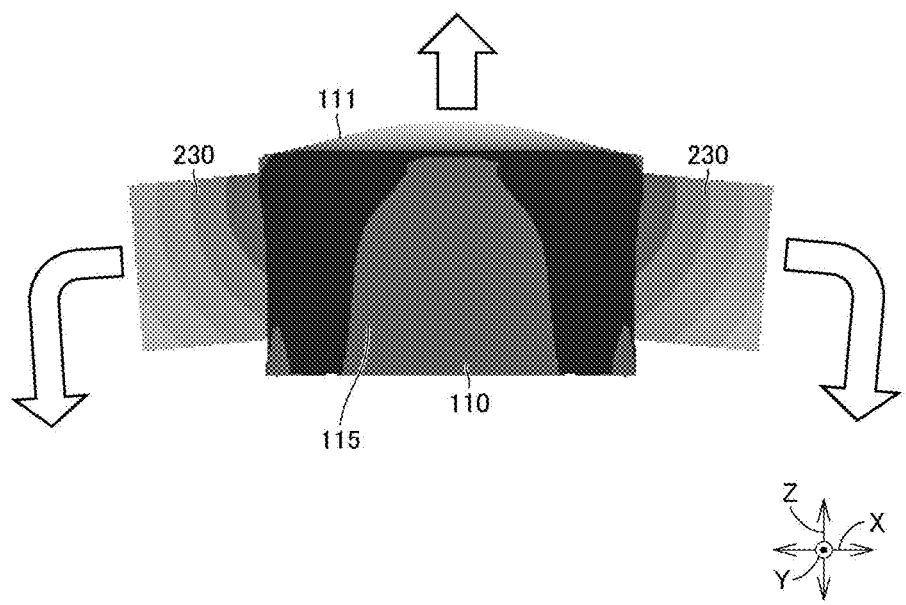
FIG. 14 is a side view illustrating, by a simulation, one state in which the case and the weight portions of the ultrasonic sensor according to example 2 vibrate at the frequency of the first vibration mode.
Figure 15:
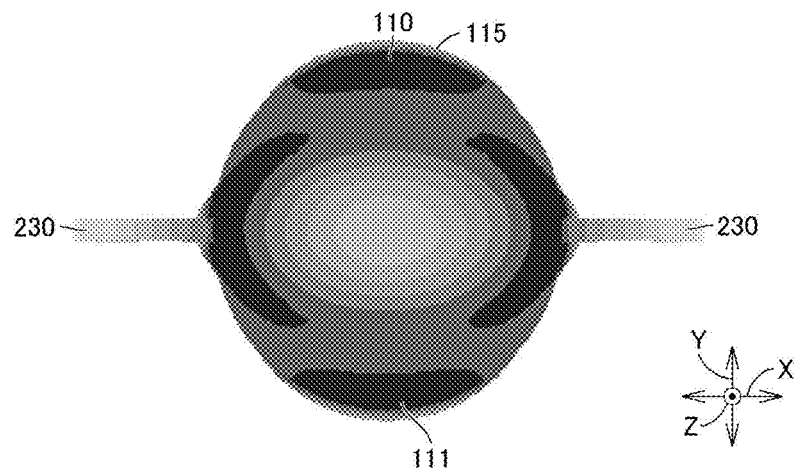
FIG. 15 is a bottom view illustrating, by a simulation, one state in which the case and the weight portions of the ultrasonic sensor according to example 2 vibrate at the frequency of the second vibration mode.
Figure 16:
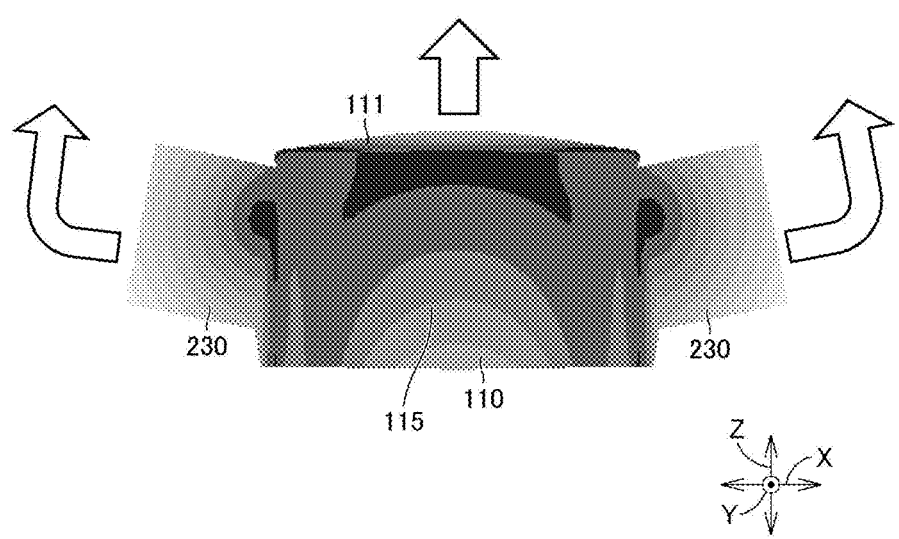
FIG. 16 is a side view illustrating, by a simulation, one state in which the case and the weight portions of the ultrasonic sensor according to example 2 vibrate at the frequency of the second vibration mode.

FIG. 13 is a bottom view illustrating, by a simulation, one state in which the case and the weight portions of the ultrasonic sensor according to example 2 vibrate at the frequency of the first vibration mode. FIG. 14 is a side view illustrating, by a simulation, one state in which the case and the weight portions of the ultrasonic sensor according to example 2 vibrate at the frequency of the first vibration mode. FIG. 15 is a bottom view illustrating, by a simulation, one state in which the case and the weight portions of the ultrasonic sensor according to example 2 vibrate at the frequency of the second vibration mode. FIG. 16 is a side view illustrating, by a simulation, one state in which the case and the weight portions of the ultrasonic sensor according to example 2 vibrate at the frequency of the second vibration mode. FIGS. 13 to 16 illustrate the case and the weight portions of the ultrasonic sensor as contour figures similar to FIGS. 6 to 9. In addition, in FIGS. 13 to 16, the ultrasonic sensor according to example 2 is given the same reference numerals as the ultrasonic sensor 200 according to preferred embodiment 2.

As illustrated in FIGS. 13 and 14, in the ultrasonic sensor according to example 2 as well, when a pulse voltage was applied to the piezoelectric element 120 to cause the case 110 to vibrate in the first vibration mode (basic vibration mode), the case 110 vibrated such that, if the bottom portion 111 bent toward one side in the axial direction Z, the two weight portions 230 inclined toward the other side in the axial direction Z. The frequency of the pulse voltage at this time was 48.281 kHz. On the other hand, as illustrated in FIGS. 15 and 16, in the ultrasonic sensor according to example 2, when a pulse voltage identical to the pulse voltage applied in the first vibration mode with the exception of the frequency was applied to the piezoelectric element 120 to cause the case 110 to vibrate in the second vibration mode, the case 110 vibrated such that the two weight portions 230 inclined toward one side in the axial direction Z when the bottom portion 111 bent toward one side in the axial direction Z. The frequency of the pulse voltage at this time was 55.655 kHz.

As illustrated in experimental example 2, in the ultrasonic sensor 200 according to preferred embodiment 2 of the present invention as well, the two weight portions 230 are provided on the circumferential wall portion 115 outside the case 110 so as not to overlap each other as seen in the axial direction Z. In addition, when the bottom portion 111 bends toward one side in the axial direction Z during vibration at the frequency of the first vibration mode, the two weight portions 230 incline toward the other side in the axial direction Z. When the bottom portion 111 bends toward one side in the axial direction Z during vibration at the frequency of the second vibration mode, the two weight portions 230 incline toward one side in the axial direction Z. Accordingly, the ultrasonic sensor 200 according to preferred embodiment 2 can also transmit and receive two ultrasonic signals of different frequencies, and the piezoelectric element 120 can be easily attached to the ultrasonic sensor 200.

In the description of the preferred embodiments described above, combinable structures may be combined with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic sensor comprising:
a bottomed cylindrical case including a bottom portion and a circumferential wall portion extending from the bottom portion in an axial direction of a central axis of the bottom portion, the central axis being perpendicular or substantially perpendicular to the bottom portion;
a piezoelectric element on the bottom portion inside the case; and
two weight portions provided on the circumferential wall portion outside the case so as not to overlap each other as seen in the axial direction; wherein
when the bottom portion bends toward one side in the axial direction during vibration at a frequency of a first vibration mode, the two weight portions incline toward another side in the axial direction and, when the bottom portion bends toward the one side in the axial direction during vibration at a frequency of a second vibration mode, the two weight portions incline toward the one side in the axial direction.

2. The ultrasonic sensor according to claim 1, wherein the two weight portions are located on a single virtual straight line passing through the central axis as seen in the axial direction.

3. The ultrasonic sensor according to claim 1, wherein the two weight portions have shapes that are rotationally symmetric with each other about the central axis.

4. The ultrasonic sensor according to claim 1, wherein the bottom portion includes a central portion and an outer circumferential portion surrounding the central portion.

5. The ultrasonic sensor according to claim 4, wherein the central portion has an outline of a rounded rectangle.

6. The ultrasonic sensor according to claim 5, wherein each of a pair of short sides of the rounded rectangle has a semicircular shape.

7. The ultrasonic sensor according to claim 4, wherein an inner circumferential edge of the outer circumferential portion extends along an outer circumferential edge of the central portion as seen in the axial direction.

8. The ultrasonic sensor according to claim 4, wherein a surface of the central portion facing an outside of the case and a surface of the central portion facing an inside of the case are perpendicular or substantially perpendicular to the axial direction.

9. The ultrasonic sensor according to claim 4, wherein a surface of the outer circumferential portion facing an outside of the case is perpendicular or substantially perpendicular to the axial direction.

10. The ultrasonic sensor according to claim 4, wherein a surface of the bottom portion facing an outside of the case is recessed in the central portion.

11. The ultrasonic sensor according to claim 4, wherein an open end surface of the circumferential wall portion has a same shape as the outer circumferential portion as seen in the axial direction.

12. The ultrasonic sensor according to claim 4, wherein an open end surface of the circumferential wall portion has an area smaller than that of the outer circumferential portion as seen in the axial direction.

13. The ultrasonic sensor according to claim 1, wherein the case is made of a conductive material or an insulating material.

14. The ultrasonic sensor according to claim 1, wherein a center of the piezoelectric element is located along the central axis.

15. The ultrasonic sensor according to claim 1, wherein the two weight portions are made of a same material as the case and are integrated with the case.

16. The ultrasonic sensor according to claim 1, further comprising a filler material and a sound absorbing material.

17. The ultrasonic sensor according to claim 16, wherein the sound absorbing material does not directly contact the two weight portions.

18. The ultrasonic sensor according to claim 4, wherein the circumferential wall portion includes an open end surface, and end surfaces of the two weight portions are continuous with the open end surface of the circumferential wall portion.

19. The ultrasonic sensor according to claim 4, wherein the circumferential wall portion includes an open end surface, and end surfaces of the two weight portions are spaced apart from the open end surface of the circumferential wall portion.

20. A distance measuring device comprising the ultrasonic sensor according to claim 1.

* * * * *